United States Patent [19]
Bryant et al.

[11] Patent Number: 5,717,970
[45] Date of Patent: Feb. 10, 1998

[54] FLASH-EMISSION GENERATED HEAT TRIGGERS SHUTTER OPENING IN CAMERA

[75] Inventors: Robert Cooper Bryant, Honeoye Falls; Michael Joseph O'Brien, Rochester, both of N.Y.

[73] Assignee: Eastman Kodak Company, Rochester, N.Y.

[21] Appl. No.: 744,687

[22] Filed: Nov. 7, 1996

Related U.S. Application Data

[63] Continuation of Ser. No. 642,029, May 2, 1996, abandoned.
[51] Int. Cl.[6] .................................................. G03B 17/38
[52] U.S. Cl. ........................................... 396/502; 396/493
[58] Field of Search ...................................... 396/181, 248, 396/452, 475, 493, 502; 348/363, 371

[56] References Cited

U.S. PATENT DOCUMENTS

| | | | |
|---|---|---|---|
| 3,714,874 | 2/1973 | Engelsmann et al. | 95/11.5 R |
| 3,785,260 | 1/1974 | Penick | 95/11.5 R |
| 3,883,885 | 5/1975 | Orlando | 354/258 |
| 4,183,648 | 1/1980 | Harvey et al. | 354/135 |
| 4,190,336 | 2/1980 | Frank et al. | 354/50 |
| 4,325,771 | 4/1982 | Brower et al. | 156/261 |
| 4,336,570 | 6/1982 | Brower et al. | 362/4 |
| 4,664,493 | 5/1987 | Takagi | 354/226 |
| 4,757,337 | 7/1988 | Shikaumi | 354/266 |
| 5,017,954 | 5/1991 | Harvey | 354/234.1 |

*Primary Examiner*—Howard B. Blankenship
*Attorney, Agent, or Firm*—Roger A. Fields

[57] ABSTRACT

A photographic apparatus, such as a camera, comprises a shutter and a heat sensitive element, for example a bimetallic beam or a fuse, for triggering opening of the shutter in response to being heated. A flash illumination source, such as flash bulb, is positioned adjacent the heat sensitive element. The heat generated during flash emission rapidly heats the heat sensitive element to trigger opening of the shutter in timed relation with flash emission.

10 Claims, 2 Drawing Sheets

FLASH-EMISSION GENERATED HEAT TRIGGERS SHUTTER OPENING IN CAMERA

This is a Continuation of application Ser. No. 08/642,029, filed May 2, 1996, now abandoned.

FIELD OF THE INVENTION

The invention relates generally to the field of photography, and in particular to cameras. More specifically, the invention relates to a camera in which flash-emission generated heat is used to trigger shutter opening for exposure.

BACKGROUND OF THE INVENTION

Commonly assigned prior art U.S. Pat. No. 5,017,954, issued May 21, 1991, discloses photographic apparatus comprising bimetallic means that bends in response to heating to close a closing blade of a two-blade type shutter, and electric circuit means including a capacitor that is discharged through the bimetallic means to heat the bimetallic means until it is bent to close the closing blade.

A problem that is found with the photographic apparatus in U.S. Pat. No. 5,017,954 is that a capacitor is needed especially for heating the heat sensitive means. This increases the relative manufacturing cost of the photographic apparatus.

SUMMARY OF THE INVENTION

The problem is solved in photographic apparatus comprising an actuatable blade of a shutter, and heat sensitive means for triggering actuation of the blade in response to being heated, by providing:

a flash illumination source that generates heat during flash emission is positioned adjacent the heat sensitive means to heat the heat sensitive means to trigger actuation of the blade in timed relation with flash emission.

DETAILED DESCRIPTION OF THE INVENTION

The invention is disclosed as being embodied preferably in a camera capable of making flash exposures. Because the features of that type of camera are generally known, the description which follows is directed in particular only to those elements forming part of or cooperating directly with the disclosed embodiment. It is to be understood, however, that other elements may take various forms known to a person of ordinary skill in the art.

Figure 1:
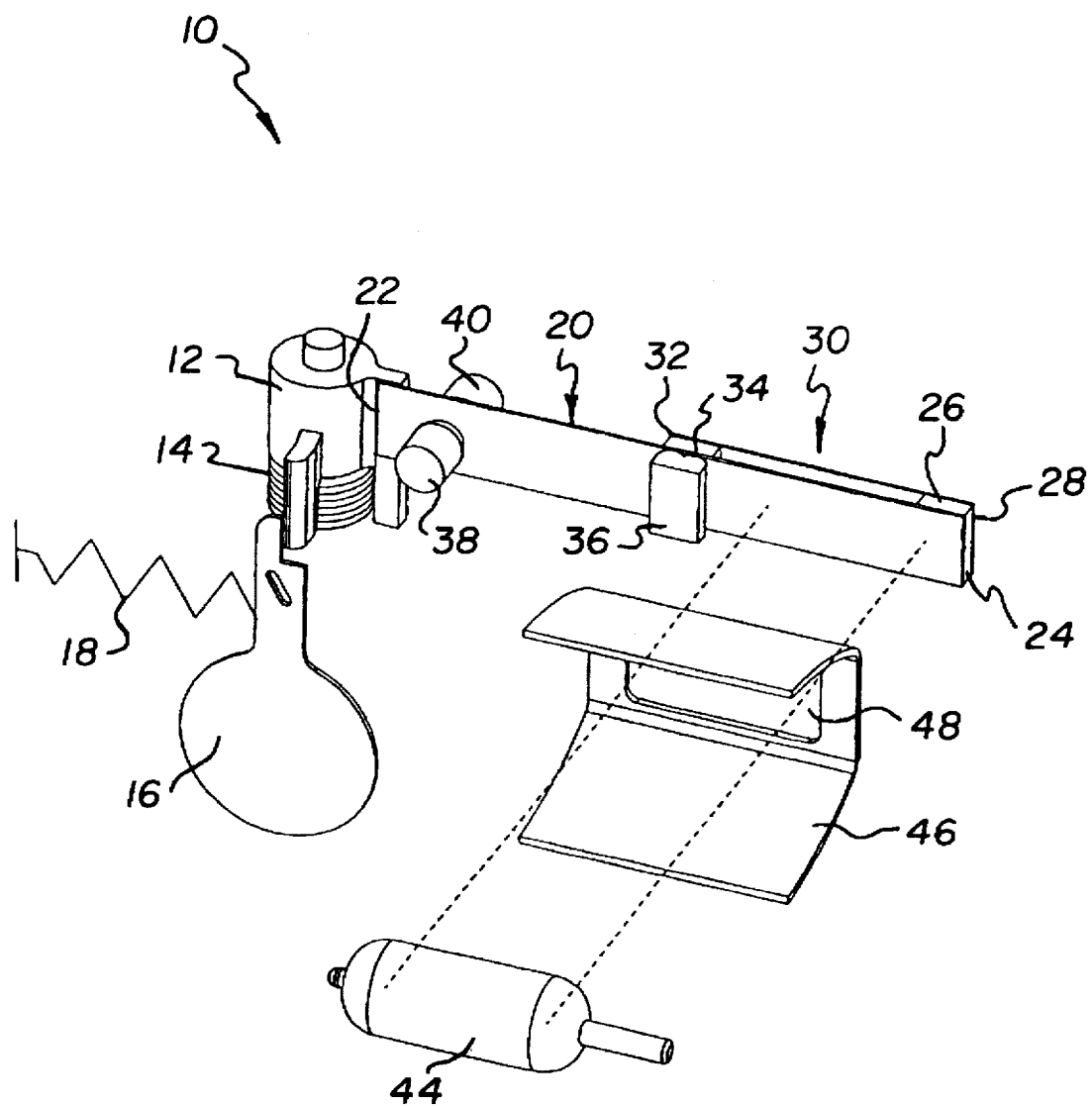
FIG. 1 is a partially exploded perspective view of photographic apparatus according to a preferred embodiment of the invention, showing the photographic apparatus before picture-taking.
Figure 2:
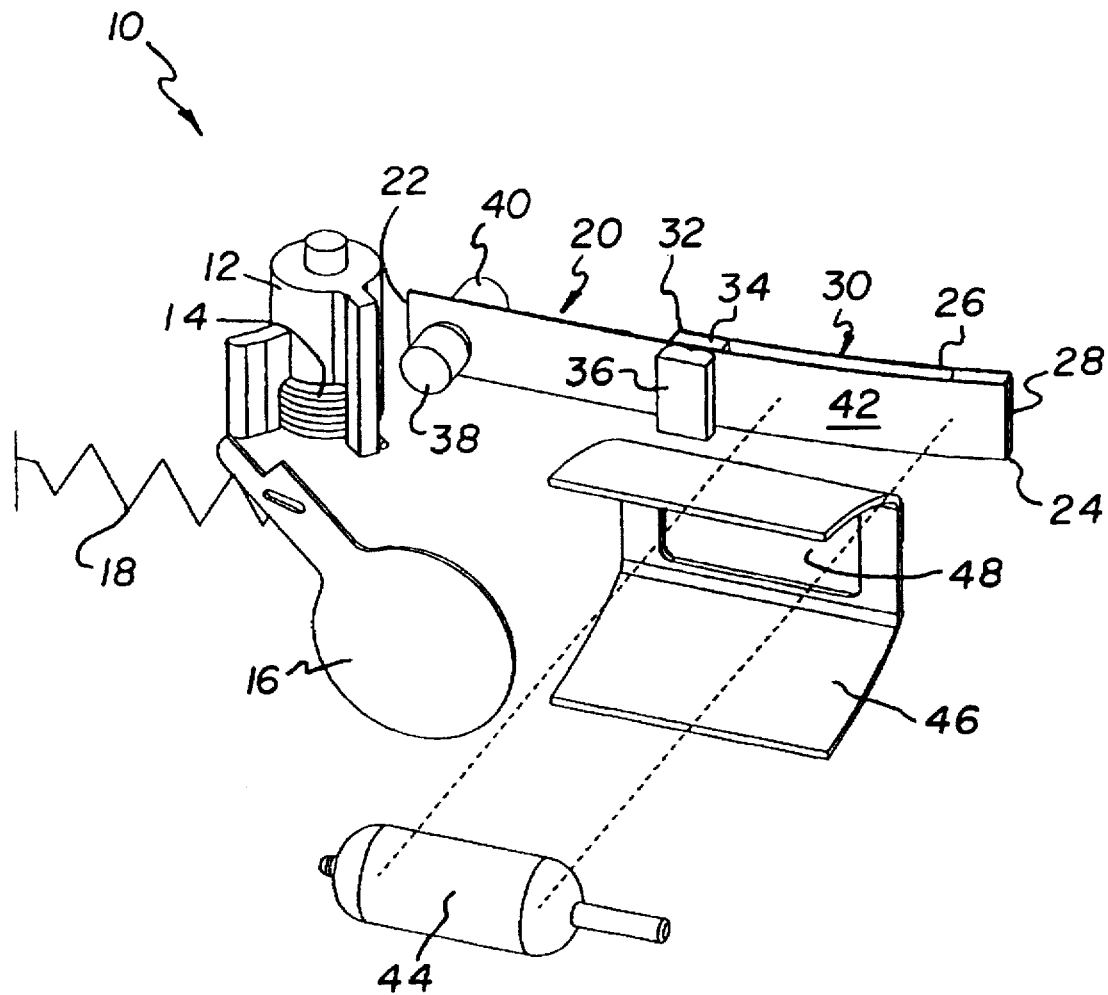
FIG. 2 is a partially exploded perspective view similar to FIG. 1, showing the photographic apparatus during picture-taking.

Referring now to the drawings, FIGS. 1 and 2 show a photographic apparatus 10, such as a camera, wherein a known-type high energy actuator 12 is rotated clockwise via a torsion spring 14 to pivot a known-type shutter blade 16 momentarily open to make an exposure. A return spring 18 pivots the shutter blade 16 quickly closed to conclude the exposure.

A bimetallic beam 20 has one end 22 that normally engages the actuator 12 to prevent the actuator from pivoting the shutter blade 16 open. The bimetallic beam 20 is a known element which bends when it is heated and rapidly cools to straighten out. Prior art U.S. Pat. No. 5,017,954, issued May 21, 1991, suggests that a bimetallic element can be a Texas Instruments product known as "Tenflex Type P 675R". Alternatively, the bimetallic element can have one layer of copper and another layer of carbon steel.

Another end 24 of the bimetallic beam 20 is adhered via an intermediate spacer or joinder block 26 to an opposite end 28 of a resilient mono-metallic flexure beam 30. The flexure beam 30 is shorter than the bimetallic beam 20 and faces the bimetallic beam as shown in FIGS. 1 and 2. A fulcrum end 32 of the flexure beam 30 is adhered to a guide block 34 that is fixed in place. The bimetallic beam 20 is supported for longitudinal movement between the guide block 34 and a closely spaced block 36 that is fixed in place and for simultaneous movement between another pair of closely spaced guide blocks 38 and 40 that are fixed in place.

When the bimetallic beam 20 is heated at a section 42 opposite the flexure beam 30, it slightly bends along that section as shown in FIG. 2, similarly bending the flexure beam 30 because of the connection of the two beam ends 24 and 28 at the joinder block 26. Since the fulcrum end 32 of the flexure beam 30 is fixed in place via the guide block 34, the bimetallic beam 20 is longitudinally moved between the pairs of guide blocks 38, 40 and 34, 36 to retract the beam end 22 from the actuator 12. This releases the actuator 12 for rotation to pivot open the shutter blade 16.

Preferably, a flash bulb 44 serves as the heat source for the bimetallic beam 20. The flash bulb 44, as shown in FIGS. 1 and 2, is positioned adjacent the section 42 of the bimetallic beam 20 to heat that section. A flash reflector 46 for the flash bulb 44 has an elongate opening 48 between the flash bulb and the section 42 of the bimetallic beam 20. Heat generated rearwardly from the flash bulb 44 during flash illumination of the subject being photographed passes through the reflector opening 48 to rapidly heat the section 42 of the bimetallic beam 20. As a result, the shutter blade 12 is pivoted open in timed relation with flash emission.

Although not shown, a known-type flash wheel may be provided for successively moving used flash bulbs from the flash reflector 46 and fresh flash bulbs to the flash reflector.

The invention has been described with reference to a preferred embodiment. However, it will be appreciated that variations and modifications can be effected by a person of ordinary skill in the art without departing from the scope of the invention. For example, in place of the bimetallic beam 20 various other known heat sensitive means, such as a heat sensitive fuse or the like, may be used to absorb heat from the flash bulb 44 to trigger opening of the shutter blade 12 in timed relation with flash emission. Also, the heat sensitive means can be used to close a shutter blade as suggested in U.S. Pat. No. 5,017,954.

PARTS LIST 10. photographic apparatus
12. actuator
14. torsion spring
16. shutter blade
18. return spring
20. bimetallic beam
22. beam end
24. beam end
26. joinder block 28. beam end
30. flexure beam
32. fulcrum end
34. guide block
36. guide block
38. guide block
40. guide block
42. beam section
44. flash bulb
46. flash reflector
48. reflector opening

We claim:

1. Photographic apparatus comprising an actuatable blade of a shutter, and heat sensitive means for triggering actuation of said blade in response to being heated, is characterized by:
   a flash illumination source that generates heat during flash emission is positioned adjacent said heat sensitive means to heat the heat sensitive means to trigger actuation of said blade in timed relation with flash emission.

2. Photographic apparatus as recited in claim 1, wherein said flash illumination source includes a flash bulb that emits flash illumination forward towards a subject being photographed and rearward to said heat sensitive means to allow the heat sensitive means to absorb flash-emission generated heat.

3. Photographic apparatus comprising a flash illumination source that generates heat during flash emission, and a shutter openable to obtain a flash exposure, is characterized by:
   heat sensitive means positioned adjacent said flash illumination source to absorb flash-emission generated heat for triggering opening of said shutter in response to being heated.

4. Photographic apparatus as recited in claim 3, wherein said heat sensitive means includes bimetallic means that bends when heated to trigger opening of said shutter, and said flash illumination means includes a flash bulb positioned adjacent said bimetallic means to heat the bimetallic means during flash emission.

5. Photographic apparatus as recited in claim 3, wherein a spring-driven actuator is actuated to open said shutter, and said heat sensitive means includes bimetallic means for restraining said actuator to prevent the actuator from opening said shutter and which bends when heated to release the actuator to open the shutter.

6. Photographic apparatus as recited in claim 5, wherein said flash illumination source includes a flash bulb, and a flash reflector has an opening positioned immediately between said flash bulb and said bimetallic means to permit the flash bulb to heat the bimetallic means during flash emission.

7. Photographic apparatus as recited in claim 5, wherein said bimetallic means is a bimetallic beam having one end that engages said actuator to prevent the actuator from opening said shutter, and a flexure beam facing said bimetallic beam has a fulcrum end that is fixed and another end that is adhered to another end of the bimetallic beam to bend with the bimetallic beam about said fulcrum end and retract said one end of the bimetallic beam from said actuator to release the actuator to open said shutter.

8. Photographic apparatus to be used with a flash illumination source that generates heat during flash emission, comprises a shutter openable to obtain a flash exposure, and is characterized by:
   heat sensitive means positioned to be adjacent the flash illumination source to absorb flash-emission generated heat from the flash illumination source, for triggering opening of said shutter in response to being heated in timed relation with flash emission.

9. A method of triggering opening of a shutter in timed relation with flash illumination, comprising:
   applying flash-emission generated heat during flash illumination to heat sensitive means for triggering opening of the shutter in response to being heated, whereby the flash-emission generated heat will cause the shutter to open.

10. Photographic apparatus comprising an activatable shutter, and heat sensitive means for triggering activation of said shutter in response to being heated, is characterized by:
    a flash illumination source that generates heat during flash emission is positioned to heat said heat sensitive means to trigger activation of said shutter in timed relation with flash emission.

* * * * *